US006775328B1

(12) United States Patent
Segaram

(10) Patent No.: US 6,775,328 B1
(45) Date of Patent: Aug. 10, 2004

(54) HIGH-SPEED COMMUNICATION SYSTEM WITH A FEEDBACK SYNCHRONIZATION LOOP

(75) Inventor: Para K. Segaram, Campbell, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/372,319

(22) Filed: Aug. 11, 1999

(51) Int. Cl.$^7$ .............................. H04B 3/00; H04L 25/00
(52) U.S. Cl. ........................ 375/257; 375/219; 375/354; 710/61
(58) Field of Search ................................. 375/257, 258, 375/219, 220, 221, 222, 354, 356, 358; 710/52, 58, 61, 71

(56) References Cited

U.S. PATENT DOCUMENTS

| | | | | |
|---|---|---|---|---|
| 5,761,209 A | * | 6/1998 | Murakami | 370/536 |
| 6,044,123 A | * | 3/2000 | Takla | 375/376 |
| 6,201,829 B1 | * | 3/2001 | Schneider | 375/221 |
| 6,236,695 B1 | * | 5/2001 | Taylor | 375/372 |
| 6,262,611 B1 | * | 7/2001 | Takeuchi | 327/159 |

OTHER PUBLICATIONS

"Draft Standard for Low–Voltage Differential Signals (LVDS) for Scalable Coherent Interface (SCI)", Draft 1.3, IEEE P1596.3–1995, pp. i–viii, pp. 1–34 (Nov. 1995).
"Media Access Control (MAC) Parameters, Physical Layer, Repeater and Management Parameters for 1000 Mb/s Operation", IEEE Draft P802.3z/D5.0, pp. i–vi, pp. 01.1–01.8, 04.7–04.36, 05.1–05.6, 06.1–06.2, 21.1–22.10, 30.1–30.54, 30A.1–30A44, 30B.1–30B.8, 1–31B.2, 34.1–34.4, 35.1–35.30, 36.1–36.48, 36A.1–36A.4, 36B.1–36B.2, 37.1–37.26, 38.1–38.32, 39.1–39.20, 41.1–42.28, 42.1–42.8 ( May 1998).

* cited by examiner

Primary Examiner—Phoung Phu
(74) Attorney, Agent, or Firm—Hunton & Williams LLP

(57) ABSTRACT

In a communications device having a physical layer device and a processing device connected to the physical layer device, the number of input/output (I/O) ports required for communication between the devices in the gigabit range is substantially reduced by utilizing millivolt differential I/O drivers and receivers. In addition, a calibration feedback loop synchronizes the data and clock signals on the processing device, thereby eliminating the need to recover the clock on the processing device.

47 Claims, 2 Drawing Sheets

HIGH-SPEED COMMUNICATION SYSTEM WITH A FEEDBACK SYNCHRONIZATION LOOP

BACKGROUND OF THE INVENTION

1. Field of the Invention

The present invention relates to a high-speed communication system and, more particularly, to a high-speed communication system with a feedback synchronization loop.

2. Description of the Related Art

A gigabit communication system is a system that transfers billions of bits of data per second between the nodes of the system. Gigabit communication systems commonly handle the data transferred over the backplane of the internet, and are expected to handle the data transferred between next-generation processors and peripherals, such as hard drives and printers.

FIG. 1 shows a block diagram that illustrates a conventional gigabit communication system 100. As shown in FIG. 1, system 100 includes a high-speed transmission medium 108, such as a fiber optic cable, and a number of communication devices 110 that receives data from, and transmits data to, medium 108.

Each communication device 110, in turn, includes a physical layer device 112 that is connected to medium 108, and a processing device 114 that is connected to physical layer device 112 by a number of lines 116. Physical layer device 112 includes a serializer/deserializer (serdes) that transforms data received from medium 108 into a signal format that is compatible with processing device 114, and transforms data from processing device 114 into a signal format that is compatible with medium 108.

When transferring data to, and receiving data from, processing circuit 114, the serdes typically utilizes a data signal which has a logic high that is represented by a maximum voltage which is equal to the supply voltage used by the processing circuit.

For example, when device 114 is formed in a 0.35 micron photolithographic process, physical layer device 112 transmits data to, and receives data from, device 114 with data signals that have a maximum voltage of approximately 3.3V, the supply voltage commonly used with 0.35 micron devices.

One channel of data is typically transported across medium 108, and between physical layer device 112 and processing device 114, at 1.25 Gb/s, with speeds of 2.5 Gb/s under consideration. Processing device 114 processes the data received from medium 108 by physical layer device 112, and outputs processed data to physical layer device 112 for transmission onto medium 108.

Physical layer device 112 and processing device 114 are typically encapsulated in separate chips which are placed on the same printed circuit board due to the largely analog nature of device 112 and the largely digital nature of device 114. One consequence of this approach, however, is that electromagnetic interference (EMI) requirements limit the maximum speed that data can be exchanged between devices 112 and 114.

For example, when data is exchanged between devices 112 and 114 with data signals having a maximum voltage of approximately 3.3V, the maximum speed that can be obtained without exceeding the EMI requirements is approximately 125 Mb/s.

Thus, to handle one channel of inbound data, which is received at 1.25 Gb/s, 10 inbound lines 116 are required to transport data from device 112 to device 114, where physical layer device 112 has 10 output ports and processing device 114 has 10 input ports. (10 inbound lines 116 at 125 Mb/s provide one channel of inbound data at 1.25 Gb/s).

Similarly, processing device 114 requires 10 outbound lines 116 to transport one channel of outbound data from device 114 to device 112, where processing device 114 has 10 output ports and physical layer device 112 has 10 input ports. Thus, device 112 and 114 each require 20 input/output ports, with 20 corresponding pins, to handle the inbound and outbound data for one channel.

To provide additional EMI margin and greater chip-to-chip spacing, communication devices with reduced chip-to-chip speeds are also available. These reduced-speed devices typically transfer data between devices 112 and 114 at 62.5 Mb/s.

One problem with communication devices that have reduced chip-to-chip speeds, however, is that devices 112 and 114 have twice as many I/O ports and twice as many pins. Thus, with a reduced-speed device, devices 112 and 114 require 40 pins each (20 inbound lines 116 at 62.5 Mb/s are required to provide one input channel at 1.25 Gb/s, while 20 outbound lines 116 at 62.5 Mb/s are required to provide one outbound channel at 1.25 Gb/s).

The pin problem becomes even worse when devices 112 and 114 are packaged as four and eight-channel devices. When packaged in this way, devices 112 and 114, when operating at a high chip-to-chip speed, i.e., 125 Mb/s, each require 80 pins and 160 pins to support four and eight-channel devices, respectively. Further, devices 112 and 114, when operating at a slower chip-to-chip speed, i.e., 62.5 Mb/s, each require 160 pins and 320 pins to support four and eight-channel devices, respectively.

The pin problem reaches critical stages when devices 112 and 114 are scaled up to handle a 2.5 Gb/s data rate from the current 1.25 Gb/s data rate. At these higher speeds, devices 112 and 114, when operating at a high chip-to-chip speed, i.e., 125 Mb/s, require 160 pins and 320 pins to support four and eight-channel devices, respectively. Further, devices 112 and 114, when operating at a slower chip-to-chip speed, i.e., 62.5 Mb/s, require 320 pins and 640 pins to support four and eight-channel devices, respectively.

Thus, there is a great need to reduce the pin counts of devices 112 and 114 when devices 112 and 114 are scaled up to handle a 2.5 Gb/s data rate. (In addition to consuming huge amounts of silicon real estate, large pin count devices also consume large amounts of power.)

One conceptual approach to reducing the pin counts is to exchange data between devices 112 and 114 with a single-ended signal that has a lower maximum voltage. For example, by lowering the maximum voltage of a single-ended data signal from 3.3V to 500 mV, the frequency of the data signal can be increased from 125 Mb/s to approximately 1.25 Gb/s without exceeding the EMI requirements. By lowering the maximum voltage from 3.3V to 250 mV, the frequency of the data signal can be increased from 125 Mb/s to approximately 2.5 Gb/s without exceeding the EMI requirements.

One problem with this conceptual approach, however, is that it is extremely difficult, if not impossible, to form inbound detectors on processing device 114, and outbound detectors on device 112, that accurately detect logic ones and logic zeros from a single-ended gigahertz data signal that has a maximum voltage in the hundreds of millivolts due to the voltage margins required by the detectors.

Another problem with this conceptual approach is that much more complex clock recovery circuitry is required to recover a clock signal from a data signal operating in the gigahertz range, such as 2.5 GHz, than from a data signal operating in the megahertz range, such as 125 MHz. Thus, much of the clock recovery circuitry that is utilized in the serdes would also be required in processing device 114 to recover the clock from a gigahertz data signal (output by device 112 to device 114) that has a maximum voltage in the hundreds of millivolts.

Another approach to reducing the pin count, that also avoids this duplication, is to integrate the functions of physical layer device 112 and processing device 114 on a single chip. One problem with this approach, however, is the incompatibility of high-precision analog circuits, which make up most of the circuits on physical layer device 112, with digital circuits, which make up most of the circuits on processing device 114.

One of these incompatibilities is the speed with which new processing technologies can be implemented. For the present, digital circuits are easily adapted to new (and smaller) processing technologies because the voltage levels that represent logic ones in the new processing technologies are still easily distinguished from the voltage levels that represent logic zeros.

For example, in both a 0.5 micron photolithographic process and a 0.35 micron photolithographic process, where a logic one is represented by a 5V signal and a 3.3V signal, respectively, the logic one is easily distinguished from a logic zero which, in both cases, has a voltage near zero.

For high-precision analog circuits, however, moving from a 0.5 micron photolithographic process to a 0.35 micron photolithographic process, where the supply voltage drops from 5V to 3.3V, dramatically reduces, among other things, the dynamic ranges of the analog devices. Further design (and time) is then often needed to develop devices which operate in these ranges.

Thus, integrating the functions of physical layer device 112 and processing device 114 on a single chip increases the time required for the digital circuitry in the integrated device to take advantage of the reduced size and power requirements provided by a new photolithographic process.

As a result, there is a need for a communication device that has a physical layer device and a processing device which operate in the gigahertz frequency range with substantially fewer pins.

SUMMARY OF THE INVENTION

In a communication device having a physical layer device and a processing device connected to the physical layer device, the pin counts of the physical layer device and the processing device are substantially reduced when operating with gigahertz signals by utilizing millivolt differential signals. In addition, a calibration feedback loop synchronizes the data and clock signals on the processing device, thereby eliminating the need for a gigahertz clock recovery circuit on the processing device.

A communications device in accordance with the present invention includes a physical layer device that has a media driver connectable to a transmission medium, a media receiver connectable to the transmission medium, and a serializer/deserializer (serdes) connected to the media driver and the media receiver. The physical layer device also includes a master circuit that is connected to the serdes. The master circuit has a first physical layer data driver that drives a millivolt differential signal, and a first physical layer data receiver.

The communications device further includes a processing circuit that has an internal circuit, and a slave circuit connected to the internal circuit and the master circuit. The slave circuit has a first processing data receiver connected to the first physical layer data driver. The first processing data receiver outputs a first signal in response to receiving the signal output from the first physical layer data driver. In addition, the slave circuit further includes a first processing data driver which is connected to the first physical layer data receiver, and connectable to the first processing data receiver.

In addition, the master circuit further includes a clock driver which is connected to the serdes and outputs a millivolt differential signal, and the slave circuit further includes a clock receiver connected to the clock driver. The clock receiver outputs a clock signal in response to a signal received from the clock driver.

Further, the first processing data driver is connectable to receive the clock signal from the clock receiver or the first signal from the first processing data receiver. The first physical layer data receiver receives the clock signal when the first processing data driver is connected to receive the clock signal, and receives the first signal when the first processing data driver is connected to receive the first signal.

The master circuit additionally includes an aligner that is connected to the first physical layer data receiver. The aligner receives the clock signal when the first physical layer data receiver receives the clock signal, and the first signal when the first physical layer data receiver receives the first signal. The aligner has phase comparison circuitry that compares the phase of the clock signal received by the aligner with the phase of the first signal received by the aligner to determine a phase difference.

The master circuit further includes a phase delay circuit that is connected to the aligner, the serdes, and the first physical layer data driver. The aligner passes a plurality of signals to the phase delay circuit that indicates the phase difference. The phase delay circuit delays the signal output from the first physical layer data driver so that the first signal received by the aligner is substantially in phase with the clock signal received by the aligner.

A better understanding of the features and advantages of the present invention will be obtained by reference to the following detailed description and accompanying drawings which set forth an illustrative embodiment in which the principles of the invention are utilized.

DETAILED DESCRIPTION

Figure 2:
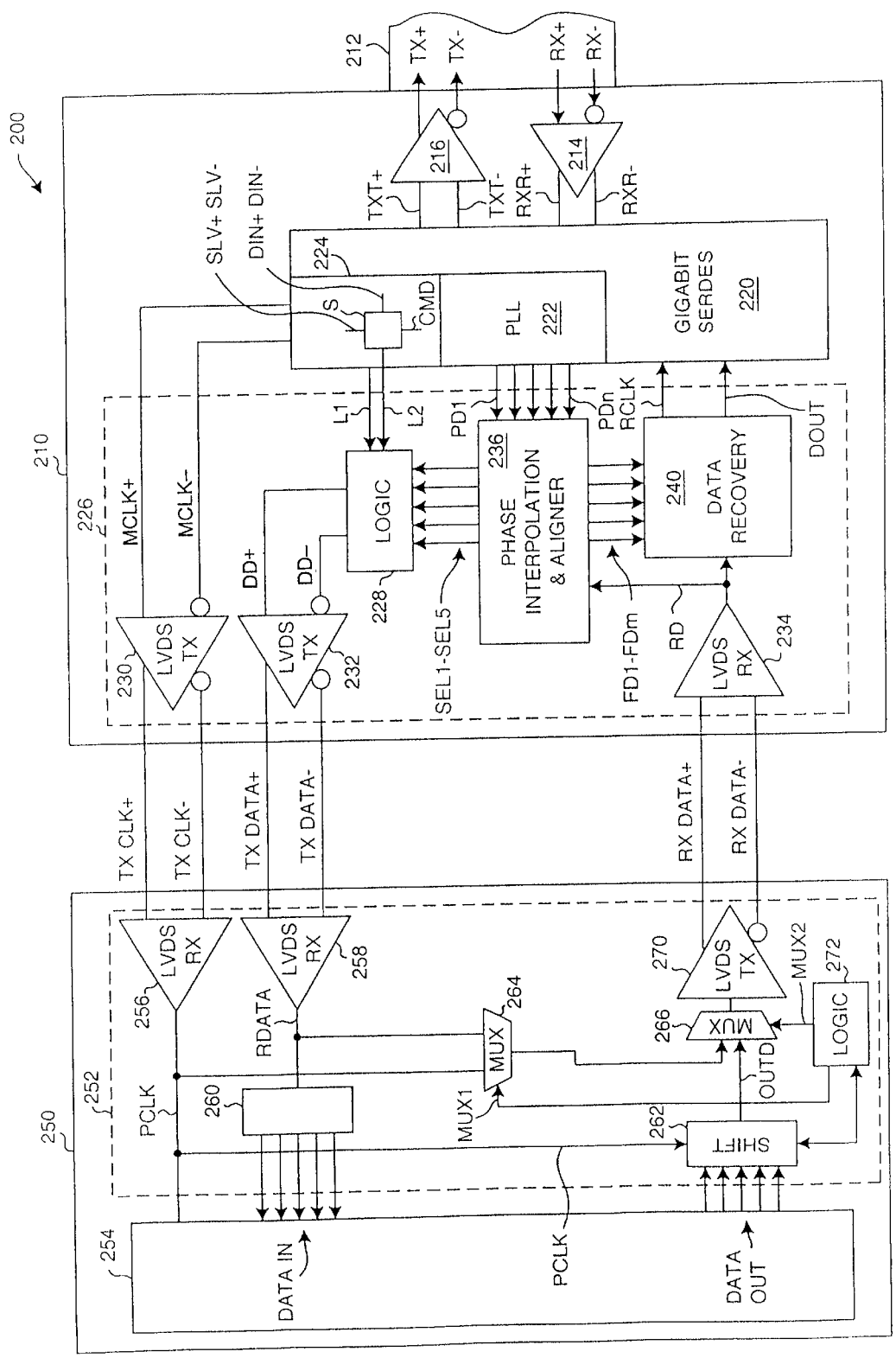
FIG. 2 is a block diagram illustrating a communication device 200 in accordance with the present invention.

FIG. 2 shows a block diagram that illustrates a communication device 200 in accordance with the present invention. As shown in FIG. 2, device 200 includes a physical layer device 210 and a processing circuit 250 that is connected to device 210. Device 210 receives information from, and transmits information to, a high-speed transmission medium 212, such as a fiber optic cable, while circuit 250 receives information from, and transmits information to, device 210.

Device 210, in turn, includes a low-voltage, differential receiver 214 that outputs a pair of differential data signals RXR+ and RXR– in response to receiving a pair of differential data signals RX+ and RX– from medium 212, and a low-voltage, differential driver 216 that outputs a pair of differential data signals TX+ and TX– to medium 212 in response to receiving a pair of differential data signals TXT+ and TXT–.

Data is preferably received from, and transmitted to, medium 212 at either 1.25 Gb/s, 1.6 Gb/s, 2.5 Gb/s, or 3.125 Gb/s. (The present invention is not limited to these frequencies, and may be used with other frequencies.)

Receiver 214 and driver 216 are preferably low-voltage PECL optical and short copper receivers and drivers, respectively. (The present invention is not limited to these drivers and receivers, and may be used with other drivers and receivers.)

In addition, device 210 also includes a gigabit serializer/deserializer (serdes) 220 that transforms the data signals RXR+ and RXR– into differential input data signals DIN+ and DIN–, and transforms an output data signal DOUT into the data signals TXT+ and TXT–. A switch S switchably connects the input data signals DIN+ and DIN– to lines L1 and L2 in response to a first logic state of a calibration command CMD.

Serdes 220 also includes a phase-lock-loop circuit 222 that outputs a base clock signal (not shown) having, for example, a frequency of 250 MHz, and a series of phase-delayed clock signals PD1–PDn which each have an equal phase delay. For example, each of five delayed clock signals can have a 72° phase shift (5*72 =360).

Serdes 220 further includes a multiplier/switch circuit 224 that multiplies the frequency of the base clock signal to output a pair of differential master clock signals MCLK+ and MCLK–. The master clock signals MCLK+ and MCLK– are preferably output at either 1.25 Gb/s, 1.6 Gb/s, 2.5 Gb/s, or 3.125 Gb/s. (The present invention is not limited to these frequencies, and may be used with other frequencies.)

In addition, circuit 224 also forms a pair of differential slave clock signals SLV+ and SLV– having the same frequency as the master clock signals MCLK+ and MCLK–. Switch S switchably connects the slave clock signals SLV+ and SLV– to lines L1 and L2 in response to a second logic state of the calibration command CMD so that the slave clock signals SLV+ and SLV– are output onto lines L1 and L2 instead of the data signals DIN+ and DIN–.

Serdes 220 is preferably implemented to comply with the IEEE 802.3z Gigabit Ethernet standard. (The present invention is not limited to the 802.3z Standard, and may be used with other standards.)

Device 210 further includes a master circuit 226 that is connected to serdes 220. Master circuit 226, in turn, includes a logic circuit 228 that outputs a pair of differential delayable signals DD+ and DD– in response to the signals on lines L1 and L2, and a series of select signals SEL1-SELs. Thus, when the input data signals DIN+ and DIN– are on lines L1 and L2, the delayable signals DD+ and DD– represent the input data signals DIN+ and DIN–; and when the slave clock signals SLV+ and SLV– are on lines L1 and L2, the delayable signals DD+ and DD– represent the slave clock signals SLV+ and SLV–.

Logic circuit 228 preferably provides a number of data paths that include a reference data path and a number of additional data paths that incrementally delay and/or advance the differential signals passing through circuit 228. The signals passing through circuit 228, in turn, follow the data path selected by the select signals SEL1-SELs. (The present invention is not limited to circuit 228, and may be used with other selectably delayable circuits.)

In addition, circuit 226 further includes a millivolt differential driver 230 that outputs a pair of differential transmit clock signals TX CLK+ and TX CLK– in response to the master clock signals MCLK+ and MCLK–, and a millivolt differential driver 232 that outputs a pair of differential transmit signals TX DATA+ and TX DATA– in response to the delayable signals DD+ and DD–.

Thus, the transmit clock signals TX CLK+ and TX CLK– represent the master clock signals MCLK+ and MCLK–. In addition, the transmit signals TX DATA+ and TX DATA– represent the input data signals DIN+ and DIN– when the delayable signals DD+ and DD– represent the input data signals DIN+ and DIN–; and the slave clock signals SLV+ and SLV– when the delayable signals DD+ and DD– represent the slave clock signals SLV+ and SLV–.

Drivers 230 and 232 preferably output the transmit clock signals TX CLK+ and TX CLK– and the transmit signals TX DATA+ and TX DATA– at either 1.25 Gbs, 1.6 Gbs, 2.5 Gbs, or 3.125 Gbs. (The present invention is not limited to these frequencies, and may be used with other frequencies.) Thus, when the transmit signals TX DATA+ and TX DATA– represent the input data signals DIN+ and DIN–, data is output from device 210 at the same data rate that device 210 receives data from medium 212.

In addition, the transmit clock signals TX CLK+ and TX CLK– and the transmit signals TX DATA+ and TX DATA– are preferably defined by the TIA/EIA-644 Low Voltage Differential Signal (LVDS) Standard (which defines a 250 mV differential signal). (The present invention is not limited to the LVDS Standard, and may be used with other low-voltage standards.) One of the advantages of the present invention is that by using millivolt differential signals, the EMI problem encountered by conventional systems is effectively eliminated.

Circuit 226 additionally includes a millivolt differential data receiver 234 that outputs a receive signal RD in response to receiving a pair of differential transmit signals RX DATA+ and RX DATA–.

Further, circuit 226 also includes a phase interpolation and aligner circuit 236 that outputs a series of finer delayed signals FD1-FDm, each having the same frequency and an equal phase delay, in response to each phase delayed signal PD. For example, if phase delayed signal PD1 represents a 0° phase shift, phase delayed signal PD2 represents a 72° phase shift, and phase delayed signal PD3 represents a 144° phase shift, 36 finer delayed signals each having a 2° phase shift are formed for signal PD1, i.e., 0°, 2°, 4°, ... 70°, while 36 finer delayed signals each having a 2° phase shift are formed for signal PD2, i.e., 72, 74°, 76°, ... 142°.

The resolution required by the system determines the number of finer delayed signals FD1-FDm that are used. For example, to have a 1° resolution rather than a 2° resolution, 72 finer delayed signals each having a 1° phase shift are formed for each of the phase delayed signals PD1-PDn.

As described in greater detail below, circuit 236 also utilizes the finer delayed signals FD1-FDm to compare the phase of a first received signal RD received at a first time and the phase of a second received signal RD received at a later time, and outputs the select signals SEL1-SELs in response to the comparison such that the select signals SEL1-SELs define a difference between the phases of the signals.

Circuit 226 further includes a data recovery circuit 240 that outputs data signal DOUT and a recovered clock signal RCLK in response to the received signal RD and the finer delayed signals FD1-FDm.

As noted above and as further shown in FIG. 2, device 200 also includes processing circuit 250. Circuit 250, in turn, includes a slave circuit 252 and an internal circuit 254 that is connected to slave circuit 252. Slave circuit 252 includes a millivolt differential receiver 256 that outputs a processing clock signal PCLK in response to receiving the clock signals TX CLK+ and TX CLK−, and a millivolt differential receiver 258 that outputs a received signal RDATA in response to receiving the transmit signals TX DATA+ and TX DATA−.

Thus, processing clock signal PCLK represents the master clock signal MCLK+ and MCLK−. In addition, the received signal RDATA represents the input data signals DIN+ and DIN− when the transmit signals TX DATA+ and TX DATA− represent the input data signals DIN+ and DIN−; and the slave clock signals SLV+ and SLV− when the transmit signals TX DATA+ and TX DATA− represent the slave clock signals SLV+ and SLV−.

Circuit 252 also includes a first shift register 260 that converts the serial received signal RDATA into an input parallel data signal DATAIN in response to the processing clock signal PCLK clocking the signal. Internal circuit 254 receives the processing clock signal PCLK and the parallel data signal DATAIN.

The processing clock signal PCLK and the received signal RDATA have an equivalent path length to the first shift register 260 (or a known phase delay). In addition, the processing clock signal PCLK and the data signals DATAIN are CMOS (or otherwise) compatible, and directly interface, with internal circuit 254.

In addition, circuit 252 further includes a second shift register 262 that directly interfaces with internal circuit 254 to convert a parallel data signal DATAOUT from internal circuit 254 into a serial data signal OUTD. Second shift register 262 utilizes the processing clock signal PCLK to clock the parallel data signal DATAOUT out of shift register 262. Thus, the data signal OUTD is synchronized to the processing clock signal PCLK.

Circuit 252 further includes a first multiplexor 264 that passes either the processing clock signal PCLK or the received signal RDATA in response to a first mux signal MUX1, and a second multiplexor 266 that passes either the processing clock signal PCLK or the received signal RDATA, or the data signal OUTD in response to a second mux signal MUX2. Further, the path lengths between receiver 256 and multiplexor 264, and between receiver 258 and multiplexor 264 are equal (or have a known phase difference).

In addition, circuit 252 includes a millivolt differential driver 270 that outputs the differential transmit signals RX DATA+ and RX DATA− in response to either the processing clock signal PCLK, the received signal RDATA, or the data signal OUTD, depending on which signal is passed by multiplexor 266.

Circuit 252 further includes a logic circuit 272 that receives the processing clock signal PCLK from shift register 262, and outputs mux signals MUX1 or MUX2 to multiplexors 264 and 266, or a fixed pattern, e.g., 1-0-1-0-1-0, to shift register 262 in response to commands embedded in the processing clock signal PCLK (by serdes 220).

The transmit signals RX DATA+ and RX DATA− are preferably output at either 1.25 Gbs, 1.6 Gbs, 2.5 Gbs, or 3.125 Gbs. (The present invention is not limited to these frequencies, and may be used with other frequencies.) Thus, the transmit signals RX DATA+ and RX DATA− are output from circuit 250, received by device 210, and output by device 210 to medium 212 at the same data rate.

In addition, the data signals RX DATA+ and RX DATA− are also preferably defined by the TIA/EIA-644 Low Voltage Differential Signal (LVDS) Standard. (The present invention is not limited to the LVDS Standard, and may be used with other low-voltage standards.)

Thus, the received signal RD represents the data signal OUTD when the transmit signals RX DATA+ and RX DATA− represent the data signal OUTD; the received signal RDATA when the transmit signals RX DATA+ and RX DATA− represent the received signal RDATA; and the processing clock signal PCLK, which represents the master clock signal MCLK+ and MCLK−, when the transmit signals RX DATA+ and RX DATA− represent the processing clock signal PCLK.

In addition, when the received signal RDATA represents the slave clock signals SLV+ and SLV−, the received signal RD represents the slave clock signals SLV+ and SLV−, and when the received signal RDATA represents the data signals DIN+ and DIN−, the received signal RD represents the signals DIN+ and DIN−.

Device 210 and circuit 250 are formed in separate packages, and may be formed on the same printed circuit board, or may be formed on separate circuit boards and connected via a back plane or bus. In addition, the frequency of the signal transmitted between the packages is a function of the distance that separates the packages.

Figure 1:
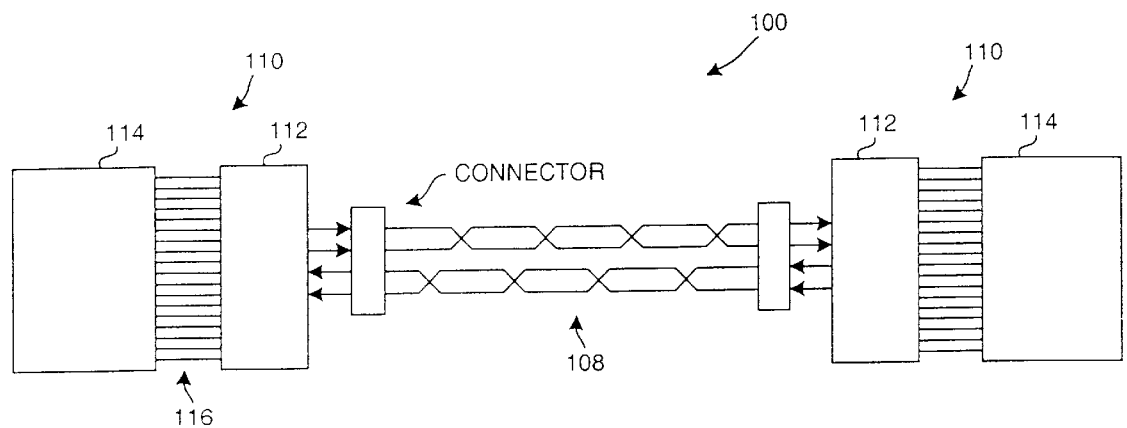
FIG. 1 is a block diagram illustrating a conventional gigabit communication system 100.
Figure 3:
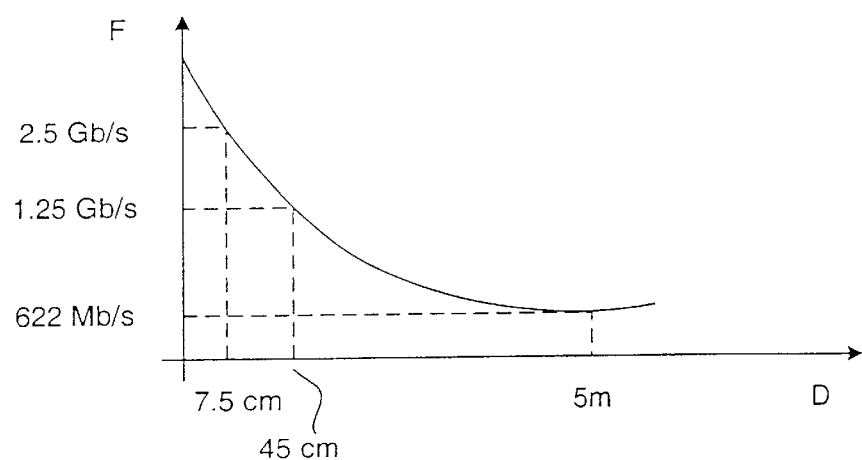
FIG. 3 is a graph illustrating the frequency F of the signal transmitted between the chips versus the distance D that separates the chips in accordance with the present invention.

FIG. 3 shows a graph that illustrates the frequency F of the signal transmitted between the chips versus the distance D that separates the chips. As shown in FIG. 3, if the chips are separated by 7.5 cm, the maximum frequency F of the signal is approximately 2.5 Gb/s; by 45 cm, the maximum frequency F of the signal is approximately 1.25 Gb/s; and by 5 meters, the maximum frequency F of the signal is approximately 622 Mb/s. Thus, one of the advantages of the present invention is that devices 112 and 114 can be further spaced apart, or placed on different circuit boards.

In operation, device 210 and circuit 250 include a calibration mode and a normal operational mode. In the calibration mode, serdes 220 outputs the master clock signals MCLK+ and MCLK− with an embedded command at the frequency of data RX+ and RX−.

The clock signals MCLK+ and MCLK− are driven by driver 230 as the clock signals TX CLK+ and TX CLK−. In response to the clock signals TX CLK+ and TX CLK−, receiver 256 outputs the processing clock signal PCLK to shift registers 260 and 262, and multiplexor 264.

The embedded clock command is passed through shift register 262 to logic circuit 272 which, in turn, sets the logic states of the MUX1 and MUX2 signals to pass the processing clock signal PCLK through multiplexors 264 and 266. The processing clock signal PCLK is then driven out of circuit 252 by driver 270 so that the transmit signals RX DATA+ and RX DATA− represent the processing clock signal PCLK.

Receiver 234 outputs the received signal RD, which represents processing clock signal PCLK, to aligner 236 in response to the transmit signals RX DATA+ and RX DATA−. Aligner 236 compares the phase of the received signal RD with the finer delayed signals FD1-FDm of each phase delayed signal PD, and identifies a finer delayed signal FD that is closest in phase with the received signal RD. Thus, since the received signal RD represents the processing clock signal PCLK which, in turn, represents the master clock signals MCLK+ and MCLK−, aligner 236 identifies a finer delayed signal FD that is closest in phase with the master clock signals MCLK+ MCLK−.

In response to either a time out or a signal from aligner 236 that the phase of the master clock signals MCLK+ MCLK− has been identified, serdes 220 changes the command embedded in the clock signals MCLK+ and MCLK−, and again outputs the clock signals MCLK+ and MCLK−. In addition, serdes 220 also switchingly connects the slave clock signals SLV+ and SLV− to lines L1 and L2.

The slave clock signals SLV+ and SLV− are passed through the reference data path and output as the delayable signals DD+ and DD− which, in turn, are driven by driver 232 as the transmit signals TX DATA+ and TX DATA−. In response to the transmit signals TX DATA+ and TX DATA−, receiver 258 outputs the received signal RDATA, representing the slave clock signals SLV+ and SLV−, which is presented to multiplexor 264.

As before, the clock signals MCLK+ and MCLK− are driven by driver 230 as the clock signals TX CLK+ and TX CLK−. In response to the clock signals TX CLK+ and TX CLK−, receiver 256 outputs the processing clock signal PCLK to shift registers 260 and 262, and multiplexor 264.

The embedded clock command is passed through shift register 262 to logic circuit 272 which, in turn, sets the logic states of the MUX1 and MUX2 signals to pass the received signal RDATA through multiplexors 264 and 266. The received signal RD is then driven out of circuit 252 by driver 270 as the transmit signals RX DATA+ and RX DATA−.

Receiver 234 outputs the received signal RD, which represents the slave clock signals SLV+ and SLV−, to aligner 236 in response to the transmit signals RX DATA+ and RX DATA−. Aligner 236 compares the phase of the received signal RD with the finer delayed signals FD1-FDm of each phase delayed signal PD, and identifies a finer delayed signal FD that is closest in phase with the received signal RD. Thus, since the received signal RD represents the slave clock signals SLV+ and SLV−, aligner 236 identifies a finer delayed signal FD that is closest in phase with the slave clock signals SLV+ and SLV−.

Aligner 236 compares the phase of the master clock signals MCLK+ and MCLK− and the slave clock signals SLV+ and SLV−, and outputs select signals SEL1-SELs which identify a synch data path from the additional data paths through logic circuit 228 such that, when the slave clock signals SLV+ and SLV− on lines L1 and L2 pass through the synch data path, the phase of the master clock signals MCLK+ and MCLK− and the phase of the slave clock signals SLV+ and SLV− are in phase when arriving at aligner 236. (The present invention is not limited to aligner 236, and may be used with other circuits which determine the difference in phase between the slave clock signals SLV+ and SLV− and the master clock signals MCLK+ and MCLK− to determine the appropriate select signals SEL1-SELs.)

Since the signal path for the signals that represent the master clock signals MCLK+ and MCLK− and the slave clock signals SLV+ and SLV− is the same from multiplexor 264 to aligner 236, the signals at the outputs of receivers 256 and 258 are also synchronized. Further, the processing clock signal PCLK at the input to internal circuit 254 and the parallel data signal DATAIN at the input to internal circuit 254 are also synchronized as the slew associated with first shift register 260 is negligible.

As noted above, device 210 and circuit 250 also include a normal operational mode. In the normal operational mode, multiplier/switch circuit 224 of serdes 220 outputs the clock signals MCLK+ and MCLK− with an embedded command at the frequency of data RX, and switchably connects the data signals DIN+ and DIN− to lines L1 and L2.

As a result, the received signal RDATA, which represents the input data signals DIN+ and DIN−, is synchronously provided to first shift register 260 with the processing clock signal PCLK. In addition, the embedded clock command is passed through shift register 262 to logic circuit 272 which, in turn, sets the logic state of the MUX2 signal to pass the data signal OUTD through multiplexor 266.

When working in the gigahertz range, simply providing equivalent path lengths for the clock and data signals passing through device 210 and circuit 250, which are formed in discrete packages, is insufficient to insure that the clock and data signals are synchronized because differences between the bonding leads and bonding conductions of the discrete packages unacceptably delay the clock signal with respect to the data signal, or vice versa.

The present invention overcomes this problem by providing two independent paths (for the clock and data signals) and one common feedback path. By synchronizing the signals at the end of the common path (at aligner 236), the signals at the beginning of the common path (at multiplexor 264) are also synchronized. By connecting the common path to the independent paths in the package that supports circuit 250, the problems caused by the differences between the bonding leads and bonding conductions of the discrete packages are eliminated.

The present invention provides a number of advantages over the prior art. In addition to eliminating the EMI problem as noted above, the present invention significantly reduces the pin count of the packages that hold device 210 and circuit 250.

In the present invention, device 210 requires six pins for transmission and reception with circuit 250, two each for drivers 230 and 232, and receiver 234. Similarly, circuit 250 requires six pins for transmission and reception with device 210, two each for receivers 256 and 258, and driver 270.

This compares with the 20 to 40 pins that are required per channel for each of the prior art packages for transmission and reception between device 210 and circuit 250. By substantially reducing the pin count, the present invention reduces the amount of silicon real estate required to implement device 210 and circuit 250 which, in turn, reduces the manufacturing costs and increases the manufacturing yield.

Another advantage is that, since device 210 and circuit 250 are formed in different packages, device 210 and circuit 250 can be formed with different processing technologies. Digital circuit 250, including the analog elements in slave circuit 252, is easily scaled down with advances in processing technology, e.g., 0.25 micron to 0.18 micron technologies, since there are so few analog devices in slave circuit 252. Device 210, which is largely analog and more difficult to scale down, can continue to use existing processing technologies until newer processes have become proven.

A further advantage of the present invention is that by synchronizing the clock and data signals on processing circuit 252, the need for a clock recovery circuit on processing circuit 252 (to recover the clock from the data input from the physical layer device) is eliminated, thereby saving additional silicon real estate and simplifying the design of slave circuit 252.

In accordance with an alternate embodiment of the present invention, a number of channels, such as four or eight, can be utilized in lieu of a single channel. In the alternate embodiment, each channel includes an inbound path having a line connected to serdes 220 and a logic circuit, a driver connected to the logic circuit, a receiver connectable to the driver, and a shift register connected to the receiver. Each channel further includes an outbound path having a shift register, a driver connectable to the shift register, a receiver connectable to the driver and connected to data recovery circuit 240.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A communication device comprising:
   a physical layer device having:
      a media driver connectable to a transmission medium;
      a media receiver connectable to the transmission medium; and
      a serializer/deserializer (serdes) connected to the media driver and the media receiver;
      a master circuit connected to the serdes, the master circuit having:
         a first physical layer data driver, the first physical layer data driver driving a millivolt differential signal; and
         a first physical layer data receiver; and
      a processing circuit having:
         an internal circuit; and
         a slave circuit connected to the internal circuit and the master circuit, the slave circuit having:
            a first processing data receiver connected to the first physical layer data driver, the first processing data receiver outputting a first signal in response to receiving the signal output from the first physical layer data driver; and
            a first processing data driver connected to the first physical layer data receiver, and connectable to the first processing data receiver.

2. The device of claim 1
   wherein the master circuit further includes a clock driver connected to the serdes, the clock driver driving a millivolt differential signal;
   wherein the slave circuit further includes a clock receiver connected to the clock driver, the clock receiver outputting a clock signal in response to a signal received from the clock driver; and
   wherein the first processing data driver is connectable to receive the clock signal from the clock receiver or the first signal from the first processing data receiver, the first physical layer data receiver receiving the clock signal when the first processing data driver is connected to receive the clock signal, and the first signal when the first processing data driver is connected to receive the first signal.

3. The device of claim 2 wherein the master circuit further comprises an aligner connected to the first physical layer data receiver, the aligner receiving the clock signal when the first physical layer data receiver receives the clock signal, the aligner receiving the first signal when the first physical layer data receiver receives the first signal, the aligner having phase comparison circuitry that compares a phase of the clock signal received by the aligner with a phase of the first signal received by the aligner to determine a phase difference.

4. The device of claim 3 wherein the master circuit further comprises a phase delay circuit connected to the aligner, the serdes, and the first physical layer data driver, the aligner passing a plurality of signals to the phase delay circuit that indicates the phase difference, the phase delay circuit delaying the signal output from the first physical layer data driver so that the first signal received by the aligner is substantially in phase with the clock signal received by the aligner.

5. The device of claim 4 wherein the slave circuit further includes:
   a first multiplexor connected to the clock input receiver and the first processing data receiver, the first multiplexor passing the clock signal output by the clock receiver when a first mux signal is in a first logic state, and passing the first signal output by the first processing data receiver when the first mux signal is in a second logic state; and
   a second multiplexor connected to the first multiplexor and the first communication data driver, the second multiplexor passing a signal output from the first multiplexor when a second mux signal is in a first logic state, and passing an output data signal when the second mux signal is in a second logic state, the signal output from the first multiplexor being the clock signal when the first mux signal is in the first logic state, and being the first signal when the first mux signal is in the second logic state.

6. The device of claim 5 wherein the slave circuit further includes a serial-to-parallel shift register connected to the clock receiver, the first processing data receiver, and the internal circuit, the clock signal output by the clock receiver clocking the shift register.

7. The device of claim 5 wherein the slave circuit further includes a parallel-to-serial shift register connected to the internal circuit, the second multiplexor, and the clock receiver, the shift register outputting a data output signal in response to a parallel data signal from the internal circuit, the clock signal output by the clock receiver clocking the parallel-to-serial shift register.

8. The device of claim 7 wherein the slave circuit further includes a logic circuit connected to the first mux, the second mux, and the parallel-to-serial shift register, the logic circuit receiving the clock signal from the parallel-to-serial shift register, and setting the logic states of the first and second mux signals in response to commands extracted from the clock signal.

9. The device of claim 8 wherein the media receiver receives a signal from the transmission media having a first frequency, wherein the signal output from the serdes has a second frequency, and wherein the first frequency and the second frequency are substantially equivalent.

10. A processing circuit comprising:
    an internal circuit; and
    a slave circuit connected to the internal circuit, the slave circuit having:
       a clock receiver connectable to a clock driver, the clock receiver outputting a clock signal in response to a millivolt differential signal received from the clock driver;
       a first processing data receiver connectable to a first physical layer data driver, the first processing data receiver outputting a first signal in response to a millivolt differential signal received from the first physical layer data driver;
       a first processing data driver connectable to a first physical layer data receiver, the first processing data driver being connectable to receive the clock signal from the clock receiver or the first signal from the first processing data receiver.

11. The circuit of claim 10 wherein the slave circuit further comprises:
- a first multiplexor connected to the clock input receiver and the first processing data receiver, the first multiplexor passing the clock signal output by the clock receiver when a first mux signal is in a first logic state, and passing the first signal output by the first processing data receiver when the first mux signal is in a second logic state; and
- a second multiplexor connected to the first multiplexor and the first communication data driver, the second multiplexor passing a signal output from the first multiplexor when a second mux signal is in a first logic state, and passing an output data signal when the second mux signal is in a second logic state, the signal output from the first multiplexor being the clock signal when the first mux signal is in the first logic state, and being the first signal when the first mux signal is in the second logic state.

12. The circuit of claim 11 wherein the slave circuit further comprises a serial-to-parallel shift register connected to the internal circuit, the clock receiver, and the first processing data receiver, the clock signal output by the clock receiver clocking the shift register.

13. The circuit of claim 12 wherein the slave circuit further comprises a parallel-to-serial shift register connected to the internal circuit, the second multiplexor, and the clock receiver, the parallel-to-serial shift register outputting a data output signal in response to a parallel data signal from the internal circuit, the clock signal output by the clock receiver clocking the parallel-to-serial shift register.

14. The circuit of claim 13 wherein the slave circuit further includes a logic circuit connected to the first mux, the second mux, and the parallel-to-serial shift register, the logic circuit receiving the clock signal from the parallel-to-serial shift register, and setting the logic states of the first and second mux signals in response to commands extracted from the clock signal.

15. A physical layer device connectable to a transmission medium, the device comprising:
- a media driver connectable to the transmission medium;
- a media receiver connectable to the transmission medium;
- a serializer/deserializer (serdes) connected to the media driver and the media receiver, the serdes outputting a master clock signal, an equivalent in-phase slave clock signal when in a calibration mode, and a data signal when in a data mode, the data signal representing a data signal received from the media receiver; and
- a master circuit, the master circuit having:
  - a clock driver connected to output the master clock signal as a millivolt differential signal;
  - a first physical layer data driver connectable to output the slave clock signal as a millivolt differential signal when the serdes is in the calibration mode, and the data signal as a millivolt differential signal when the serdes is in the data mode.

16. The device of claim 15 wherein the master circuit further includes:
- a first physical layer data receiver that receives a signal which represents the master clock signal during a first phase of the calibration mode, and represents the slave clock signal during a second phase of the calibration mode; and
- an aligner connected to the first physical layer data receiver, the aligner receiving the master clock signal when the first physical layer data receiver receives the master clock signal, and the slave clock signal when the first physical layer data receiver receives the slave clock signal, the aligner having phase comparison circuitry that compares a phase of the master clock signal received by the aligner with a phase of the slave clock signal received by the aligner to determine a phase difference.

17. The device of claim 16 wherein the master circuit further comprises a phase delay circuit connected to the aligner, the serdes, and the first physical layer data driver, the aligner passing a plurality of signals to the phase delay circuit that indicates the phase difference, the phase delay circuit delaying the slave clock signal output from the serdes an amount so that the slave clock signal received by the aligner is substantially in phase with the master clock signal received by the aligner when in the calibration mode, the data signal being delayed the amount when in the data mode.

18. A method for operating a communication device having a physical layer device connected to a transmission medium and a processing device connected to the physical layer device, the method comprising the steps of:
- outputting a master clock signal from the physical layer device over a first path;
- receiving the master clock signal in the processing device from the first path;
- outputting the master clock signal as a feedback master clock signal from the processing device over a feedback path;
- receiving the feedback master clock signal in the physical layer device from the feedback path;
- determining a phase of the feedback master clock signal;
- outputting a slave clock signal from the physical layer device over a second path after the phase of the feedback master clock signal has been determined, the master clock signal and the slave clock signal having an equivalent frequency;
- receiving the slave clock signal in the processing device from the second path;
- outputting the slave clock signal as a feedback slave clock signal from the processing device over the feedback path;
- receiving the feedback slave clock signal in the physical layer device from the feedback path;
- determining a phase of the feedback slave clock signal;
- comparing the phase of the feedback master clock signal with the phase of the feedback slave clock signal to determine a phase difference; and
- adjusting a delay so that the phase of the feedback slave clock signal is substantially aligned with the phase of the feedback master clock signal.

19. The method of claim 18 and further comprising the steps of:
- outputting a data clock signal from the physical layer device over the first path after the phase difference has been determined;
- outputting an input data signal from the physical layer device over the second path after the phase difference has been determined, the input data signal and the data clock signal having an equivalent frequency; and
- converting the input data signal to a parallel word by clocking the input data signal with the data clock signal.

20. A communication device comprising:
- a physical layer device connectable to a transmission medium, the device having a master circuit, the master circuit having:

a clock output;
a first data output:
a first data input;
a phase comparator connected to the first data input; and
a processing circuit having a slave circuit, the slave circuit having:
a clock input connected to the clock output;
a second data input connected to the first data input;
a second data output connected to the first data input; and
a switch for connecting an output signal from the clock input to the second data output, or an output signal from the second data input to the second data output, the phase comparator comparing a phase of the output signal from the clock input with a phase of the output signal from the second data input to determine a phase difference.

21. A communication device for communication over a transmission medium, the communication device comprising:
a processing circuit comprising a first differential receiver, a second differential receiver, and a differential driver; and
a physical layer device connectable to the transmission medium such that data passes from the transmission medium through the physical layer device and to the processing circuit, the physical layer device comprising a first differential driver, a second differential driver, a differential receiver, and alignment circuitry, the alignment circuitry changing a second signal path such that a phase of a second signal received by the alignment circuitry from the second signal path substantially matches a phase of a first signal received by the alignment circuitry from a first signal path, the first signal path extending through the first differential driver of the physical layer device to the first differential receiver of the processing circuit and through the first differential receiver of the processing circuit to the differential driver of the processing circuit and through the differential driver of the processing circuit to the differential receiver of the physical layer device, the second signal path extending through the second differential driver of the physical layer device to the second differential receiver of the processing circuit and through the second differential receiver of the processing circuit to the differential driver of the processing circuit and through the differential driver of the processing circuit to the differential receiver of the physical layer device.

22. The communication device of claim 21, wherein a signal passes through the second signal path and has a propagation delay, the alignment circuitry changing the second signal path such that the propagation delay is changed.

23. The communication device of claim 21, wherein the first signal is received by the alignment circuitry at a first time, and the second signal is received by the alignment circuitry at a second time.

24. The communication device of claim 21, wherein the alignment circuitry comprises:
delay logic that receives a signal and outputs the signal to the second differential driver of the physical layer device, the delay logic having a plurality of delay select input leads; and
an aligner having a signal input lead and a plurality of delay select output leads, the delay select output leads being coupled to the delay select input leads of the delay logic, the signal input lead of the aligner being coupled to the differential receiver of the physical layer device.

25. The communication device of claim 21, wherein the data passes through the transmission medium and to the physical layer device at a rate of at least 1.25 gigabits per second, the transmission medium being a fiber optic cable.

26. The communication device of claim 21, wherein the physical layer device is a first integrated circuit, and wherein the processing circuit is a second integrated circuit.

27. The communication device of claim 21, wherein the processing circuit comprises multiplexer circuitry that selectively couples an output lead of the first differential receiver of the processing circuit or an output lead of the second differential receiver of the processing circuit to an input lead of the differential driver of the processing circuit.

28. The communication device of claim 27, wherein the physical layer device transmits a first command to the processing circuit in a calibration mode, the first command being transmitted as a differential signal, the first command causing the multiplexer circuitry to couple the output lead of the first differential receiver of the processing circuit to the input lead of the differential driver of the processing circuit,
and wherein the physical layer device transmits a second command to the processing circuit in the calibration mode, the second command being transmitted as a differential signal, the second command causing the multiplexer circuitry to couple the output lead of the second differential receiver of the processing circuit to the input lead of the differential driver of the processing circuit.

29. The communication device of claim 28, wherein the first and second commands are communicated from the first differential driver of the physical layer device to the first differential receiver of the processing circuit.

30. The communication device of claim 24, wherein the physical layer device further comprises:
a phase-locked-loop circuit that outputs a base clock signal and a series of phase-delayed signals, the phase-delayed signals being supplied to the aligner; and
a multiplier/switch circuit that frequency multiplies the base clock signal to generate the second signal, the multiplier/switch circuit selectively outputting the data or the second signal to the delay logic, the multiplier/switch circuit also frequency multiplying the base clock signal to generate the first signal, the multiplier/switch circuit outputting the first signal to the first differential driver of the physical layer device.

31. The communication device of claim 21, wherein the physical layer device is a first integrated circuit, wherein the processing circuit is a second integrated circuit, and wherein the processing circuit includes no clock recovery circuit that recovers any clock for the data.

32. An apparatus comprising:
a processing circuit integrated circuit (PCIC); and
a physical layer device integrated circuit (PLDIC) connectable to a fiber optic transmission medium such that data passes from the fiber optic transmission medium through the PLDIC and to the PCIC at a rate of at least 1.25 gigabits per second, a first differential signal path extending via a first pair of wires from the PLDIC to the PCIC, a second differential signal path extending via a second pair of wires from the PLDIC to the PCIC, a third differential signal path extending via a third pair of wires from the PCIC to the PLDIC, wherein the PLDIC comprises:

means for changing the second signal path such that a phase of a first signal received at the means substantially matches a phase of a second signal received at the means, the first signal passing from the PLDIC via the first differential signal path to the PCIC and then passing from the PCIC via the third signal path to the PLDIC, the second signal passing from the PLDIC via the second differential signal path to the PCIC and then passing from the PCIC via the third signal path to the PLDIC.

33. The apparatus of claim 32, wherein the data passes over one of the first and second pairs of wires, wherein a clock for the data passes over the other of the first and second pairs of wires, and wherein the PCIC comprises no clock recovery-circuit that recovers any clock for the data.

34. The apparatus of claim 32, wherein the means is also for transmitting a first command to the PCIC such that the PCIC causes the first signal to pass across the third pair of wires back to the PCIC, and wherein the means is also for transmitting a second command to the PCIC such that the PCIC causes the second signal to pass across the third pair of wires back to the PCIC.

35. An integrated circuit comprising:
a data receiver;
phase alignment circuitry coupled to the data receiver to identify a first clock signal having a phase aligned with a first signal received via the data receiver during a first time interval and to identify a second clock signal having a phase aligned with a second signal received via the data receiver during a second time interval;
a signal output driver; and
delay circuitry coupled to the signal output driver and the phase alignment circuitry to delay outputting a signal to the signal output driver according to a difference in phase between the first clock signal and the second clock signal.

36. A system comprising:
a first integrated circuit having a clock input, a first data input, a first data output and a calibration path selectively configurable to couple either the clock input to the first data output or the first data input to the first data output; and
a second integrated circuit having a clock output coupled to the clock input, a second data output coupled to the first data input, a second data input coupled to the first data output and phase detection circuitry coupled to the second data input to detect the phase of a periodic signal output to the first integrated circuit by either the second data output or the clock output and propagated to the phase detection circuitry via the calibration path, the first data output and the second data input.

37. The system of claim 36, wherein the first integrated circuit receives a command from the second integrated circuit via the clock input, wherein if the command is a first command then the calibration path is configured such that the clock input is coupled to the first data output, and wherein if the command is a second command then the calibration path is configured such that the first data input is coupled to the first data output.

38. The system of claim 36, wherein the phase detection circuitry detects a phase of a first periodic signal at a first time, the first periodic signal being output to the first integrated circuit by the clock output and being propagated to the phase detection circuitry via the calibration path, the first data output and the second data input, and wherein the phase detection circuitry detects a phase of a second periodic signal at a second time, the second periodic signal being output to the first integrated circuit by the second data output and being propagated to the phase detection circuitry via the calibration path, the first data output and the second data input.

39. The system of claim 38, wherein the second integrated circuit further comprises delay circuitry, the delay circuitry changing a propagation delay on the second integrated circuit such that the phase of the second periodic signal received at the phase detection circuitry substantially matches the phase of the first periodic signal received at the phase detection circuitry.

40. A system comprising:
a first integrated circuit including a first data output driver, a first data receiver, a clock receiver, and a calibration path having selectable first and second configurations, the calibration path coupling the clock receiver to the first data output driver when in the first configuration and coupling the first data receiver to the first data output driver when in the second configuration; and
a second integrated circuit including a second data receiver coupled to the first data output driver, a second data output driver coupled to the first data receiver, a clock output driver coupled to the clock receiver, and phase detection circuitry coupled to the second data receiver to detect the phase of a first periodic signal output by the clock output driver and propagated to the phase detection circuitry via the calibration path when the calibration path is in the first configuration and to detect the phase of a second periodic output by the second data output driver and propagated to the phase detection circuitry via the calibration path when the calibration path is in the second configuration.

41. A method, comprising the steps of:
(a) transmitting a first periodic signal from a physical layer device integrated circuit (PLDIC) to a processing circuit integrated circuit (PCIC) via a first signal path, the first periodic signal then passing from the PCIC and to a phase detector on the PLDIC via a third signal path;
(b) detecting on the phase detector of the PLDIC a phase of the first periodic signal;
(c) after step (b), transmitting a second periodic signal from the PLDIC to the PCIC via a second signal path, the second periodic signal then passing from the PLDIC and to the phase detector on the PLDIC via the third signal path;
(d) detecting on the phase detector of the PLDIC a phase of the second periodic signal;
(e) modifying a signal path on the PCIC such that the phase of the second periodic signal detected in (d) substantially matches the phase of the first periodic signal detected in (b); and
(f) receiving data onto the PLDIC serially from a transmission medium at a rate of at least 1.25 gigabits per second, the data and a clock for the data being transmitted from the PLDIC to the PCIC via the first signal path and the second signal path such that the data passes serially from the PLDIC to the PCIC at a rate of at least 1.25 gigabits per second.

42. The method of claim 41, wherein the transmission medium is a fiber optic cable.

43. The method of claim 41, wherein the PCIC comprises no clock recovery circuit that recovers a clock signal from the data that passes serially from the PLDIC to the PCIC.

44. A method, comprising the steps of:
(a) transmitting from an integrated circuit a first signal, the first signal being transmitted from the integrated circuit via a first driver;

(b) receiving onto the integrated circuit the first signal, the first signal being received onto the integrated circuit via a receiver;

(c) transmitting from the integrated circuit a second signal, the second signal being transmitted from the integrated circuit via a second driver;

(d) receiving onto the integrated circuit the second signal, the second signal being received onto the integrated circuit via the receiver;

(e) changing a path on the integrated circuit through which the second signal passes such that the second signal received onto the integrated circuit is synchronized with respect to the first signal received onto the integrated circuit; and (f) receiving data onto the integrated circuit serially from a transmission medium at a rate of at least 1.25 gigabits per second, the data and a clock for the data being transmitted from integrated circuit via the first driver and the second driver such that the data passes serially from the integrated circuit at a rate of at least 1.25 gigabits per second.

45. The method of claim 44, further comprising the step of:

after (b) and before (c), transmitting from the integrated circuit an embedded command, the embedded command being transmitted from the integrated circuit via a driver.

46. The method of claim 45, wherein the driver from which the embedded command is transmitted from the integrated circuit is the first driver.

47. The method of claim 44, wherein the first driver is a differential driver, wherein the second driver is a differential driver, wherein the receiver is a differential receiver, and wherein the transmission medium is a fiber optic cable.

* * * * *